(12) United States Patent
Odenwalder (10) Patent No.: US 8,576,894 B2
(45) Date of Patent: Nov. 5, 2013

(54) SYSTEMS AND METHODS FOR USING CODE SPACE IN SPREAD-SPECTRUM COMMUNICATIONS

(75) Inventor: Joseph P. Odenwalder, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 12/858,999

(22) Filed: Aug. 18, 2010

(65) Prior Publication Data

US 2010/0309954 A1   Dec. 9, 2010

Related U.S. Application Data

(63) Continuation of application No. 10/783,771, filed on Feb. 20, 2004.

(60) Provisional application No. 60/470,770, filed on May 14, 2003, provisional application No. 60/452,790, filed on Mar. 6, 2003.

(51) Int. Cl.
  *H03B 1/00* (2006.01)
(52) U.S. Cl.
  USPC .......................................... 375/146
(58) Field of Classification Search
  USPC ......... 375/146, 147, 130, 136, 140, 295, 316; 370/209, 342, 335, 441
  See application file for complete search history.

(56) References Cited

U.S. PATENT DOCUMENTS

| | | | |
|---|---|---|---|
| 2,149,518 A | 3/1939 | Thomas, Sr. | |
| 3,470,324 A | 9/1969 | Henning | |
| 4,768,023 A | 8/1988 | Xie | |
| 5,280,472 A | 1/1994 | Gilhousen et al. | |
| 5,394,433 A | 2/1995 | Bantz et al. | |
| 5,406,585 A | 4/1995 | Rohani et al. | |

(Continued)

FOREIGN PATENT DOCUMENTS

| | | |
|---|---|---|
| CN | 1166094 | 11/1997 |
| CN | 1263675 | 8/2000 |

(Continued)

OTHER PUBLICATIONS

Adachi F et al: "Wideband multi-rate DS-CDMA for next generation mobile communications systems", Wireless Communications Conference, 1997., Proceedings Boulder, CO, USA Aug. 11-13, 1997, New York, NY, USA,IEEE, US, Aug. 11, 1997, pp. 57-62, XP010245557, DOI: DOI:10.1109/WCC.1997.622247 ISBN: 978-0-7803-41 94-4.

(Continued)

*Primary Examiner* — Khai Tran
(74) *Attorney, Agent, or Firm* — Eric Ho (57) ABSTRACT

Systems and methods for improving the performance of direct-sequence spread-spectrum communication systems. In one embodiment, a system comprises at least one communication channel that utilizes two different orthogonal spreading codes and corresponding portions of the available orthogonal code space. Portions of the data processed by the communication channel are demultiplexed into different streams and covered with corresponding, different orthogonal spreading codes. The streams covered by the different orthogonal codes are then combined and transmitted via the same communication channel. One embodiment utilizes at least two different Walsh codes of different lengths (+– and ++––) in order to make use of the three quarters of the Walsh space not utilized by low-rate legacy channels.

44 Claims, 5 Drawing Sheets

(56) References Cited

U.S. PATENT DOCUMENTS

| | | | |
|---|---|---|---|
| 5,463,342 | A | 10/1995 | Guard |
| 5,483,557 | A | 1/1996 | Webb |
| 5,490,165 | A | 2/1996 | Blakeney, II et al. |
| 5,535,214 | A | 7/1996 | Shiobara |
| 5,544,156 | A | 8/1996 | Teder et al. |
| 5,553,062 | A | 9/1996 | Schilling et al. |
| 5,581,575 | A | 12/1996 | Zehavi et al. |
| 5,592,470 | A | 1/1997 | Rudrapatna et al. |
| 5,627,938 | A | 5/1997 | Johnston |
| 5,647,366 | A | 7/1997 | Weng |
| 5,712,869 | A * | 1/1998 | Lee et al. .................. 375/141 |
| 5,719,852 | A | 2/1998 | Schilling et al. |
| 5,726,978 | A | 3/1998 | Frodigh et al. |
| 5,732,391 | A | 3/1998 | Fiocca |
| 5,745,480 | A | 4/1998 | Behtash et al. |
| 5,752,193 | A | 5/1998 | Scholefield et al. |
| 5,754,537 | A | 5/1998 | Jamal |
| 5,764,551 | A | 6/1998 | McCorkle |
| 5,774,809 | A | 6/1998 | Tuutijarvi et al. |
| 5,781,861 | A | 7/1998 | Kang et al. |
| 5,809,059 | A | 9/1998 | Souissi et al. |
| 5,815,526 | A | 9/1998 | Rice |
| 5,857,174 | A | 1/1999 | Dugan |
| 5,862,451 | A | 1/1999 | Grau et al. |
| 5,864,760 | A | 1/1999 | Gilhousen et al. |
| 5,875,214 | A | 2/1999 | Urbaniak et al. |
| 5,903,608 | A | 5/1999 | Chun |
| 5,914,950 | A | 6/1999 | Tiedemann, Jr. et al. |
| 5,920,705 | A | 7/1999 | Lyon et al. |
| 5,923,650 | A | 7/1999 | Chen et al. |
| 5,938,749 | A | 8/1999 | Rusu et al. |
| 5,956,642 | A | 9/1999 | Larsson et al. |
| 5,966,377 | A | 10/1999 | Murai |
| 5,966,670 | A | 10/1999 | Keskitalo et al. |
| 5,969,751 | A | 10/1999 | Lee |
| 5,973,642 | A | 10/1999 | Li et al. |
| 5,991,271 | A | 11/1999 | Jones et al. |
| 5,991,273 | A | 11/1999 | Abu-Dayya |
| 6,005,876 | A | 12/1999 | Cimini, Jr. et al. |
| 6,014,373 | A | 1/2000 | Schilling et al. |
| 6,046,980 | A | 4/2000 | Packer |
| 6,049,716 | A | 4/2000 | Jung |
| 6,052,594 | A | 4/2000 | Chuang et al. |
| 6,061,359 | A | 5/2000 | Schilling et al. |
| 6,064,692 | A | 5/2000 | Chow |
| 6,085,091 | A | 7/2000 | Yoo et al. |
| 6,088,387 | A | 7/2000 | Gelblum et al. |
| 6,094,459 | A | 7/2000 | Kao et al. |
| 6,101,168 | A | 8/2000 | Chen et al. |
| 6,108,374 | A | 8/2000 | Balachandran et al. |
| 6,108,384 | A | 8/2000 | Okumura et al. |
| 6,111,911 | A | 8/2000 | Sanderford, Jr. et al. |
| 6,115,357 | A | 9/2000 | Packer et al. |
| 6,128,283 | A | 10/2000 | Sabaa et al. |
| 6,128,349 | A | 10/2000 | Chow |
| 6,128,882 | A | 10/2000 | Jones |
| 6,130,882 | A | 10/2000 | Levin |
| 6,131,016 | A | 10/2000 | Greenstein et al. |
| 6,134,215 | A | 10/2000 | Agrawal et al. |
| 6,134,218 | A | 10/2000 | Holden |
| 6,141,388 | A | 10/2000 | Servais et al. |
| 6,144,654 | A | 11/2000 | Ibanez-Meier et al. |
| 6,151,696 | A | 11/2000 | Miller et al. |
| 6,195,552 | B1 | 2/2001 | Jeong et al. |
| 6,201,576 | B1 | 3/2001 | Raghunath et al. |
| 6,201,954 | B1 | 3/2001 | Soliman |
| 6,205,129 | B1 | 3/2001 | Esteves et al. |
| 6,208,699 | B1 | 3/2001 | Chen et al. |
| 6,208,858 | B1 | 3/2001 | Antonio et al. |
| 6,219,374 | B1 | 4/2001 | Kim et al. |
| 6,222,875 | B1 | 4/2001 | Dahlman et al. |
| 6,222,888 | B1 | 4/2001 | Kao et al. |
| 6,230,203 | B1 | 5/2001 | Koperda et al. |
| 6,233,455 | B1 | 5/2001 | Ramakrishna et al. |
| 6,259,746 | B1 | 7/2001 | Levin et al. |
| 6,292,515 | B1 | 9/2001 | Kao et al. |
| 6,298,041 | B1 | 10/2001 | Packer |
| 6,307,844 | B1 | 10/2001 | Tsunehara et al. |
| 6,335,922 | B1 | 1/2002 | Tiedemann, Jr. et al. |
| 6,347,080 | B2 | 2/2002 | Jou et al. |
| 6,363,255 | B1 | 3/2002 | Kuwahara |
| 6,389,056 | B1 | 5/2002 | Kanterakis et al. |
| 6,414,988 | B1 | 7/2002 | Ling |
| 6,425,105 | B1 | 7/2002 | Piirainen et al. |
| 6,426,960 | B2 | 7/2002 | Antonio |
| 6,442,130 | B1 | 8/2002 | Jones, IV et al. |
| 6,456,653 | B1 | 9/2002 | Sayeed |
| 6,483,816 | B2 | 11/2002 | Tsunehara et al. |
| 6,490,461 | B1 | 12/2002 | Muller |
| 6,496,496 | B1 | 12/2002 | Ramakrishna et al. |
| 6,505,058 | B1 | 1/2003 | Willey |
| 6,507,585 | B1 | 1/2003 | Dobson |
| 6,512,925 | B1 | 1/2003 | Chen et al. |
| 6,532,363 | B1 | 3/2003 | Pussinen |
| 6,535,723 | B1 | 3/2003 | Jiang et al. |
| 6,549,561 | B2 | 4/2003 | Crawford |
| 6,563,885 | B1 | 5/2003 | Magee et al. |
| 6,570,444 | B2 | 5/2003 | Wright |
| 6,571,101 | B1 | 5/2003 | Schulz |
| 6,571,104 | B1 | 5/2003 | Nanda et al. |
| 6,574,205 | B1 | 6/2003 | Sato |
| 6,590,879 | B1 | 7/2003 | Huang et al. |
| 6,597,913 | B2 | 7/2003 | Natarajan |
| 6,609,007 | B1 | 8/2003 | Eibling et al. |
| 6,654,609 | B2 | 11/2003 | Kim |
| 6,680,925 | B2 | 1/2004 | Wu et al. |
| 6,693,892 | B1 | 2/2004 | Rinne et al. |
| 6,694,469 | B1 | 2/2004 | Jalali et al. |
| 6,701,151 | B2 | 3/2004 | Diachina et al. |
| 6,711,208 | B2 | 3/2004 | Razoumov et al. |
| 6,741,862 | B2 | 5/2004 | Chung et al. |
| 6,744,754 | B1 | 6/2004 | Lee |
| 6,751,264 | B2 | 6/2004 | Ho et al. |
| 6,751,444 | B1 | 6/2004 | Meiyappan |
| 6,757,241 | B1 | 6/2004 | Jones et al. |
| 6,760,303 | B1 | 7/2004 | Brouwer |
| 6,775,544 | B2 | 8/2004 | Ficarra |
| RE38,603 | E | 9/2004 | Kim et al. |
| 6,816,827 | B1 | 11/2004 | Xia et al. |
| 6,836,666 | B2 | 12/2004 | Gopalakrishnan et al. |
| 6,847,826 | B1 | 1/2005 | Wesby et al. |
| 6,847,828 | B2 | 1/2005 | Miyoshi et al. |
| 6,865,389 | B2 | 3/2005 | Lee et al. |
| 6,876,641 | B2 | 4/2005 | Banister |
| 6,879,576 | B1 | 4/2005 | Agrawal et al. |
| 6,880,103 | B2 | 4/2005 | Kim et al. |
| 6,898,418 | B2 | 5/2005 | Rauschmayer |
| 6,904,286 | B1 | 6/2005 | Dantu |
| 6,917,581 | B2 | 7/2005 | Proctor, Jr. et al. |
| 6,937,582 | B1 | 8/2005 | Kronestedt |
| 6,952,561 | B1 | 10/2005 | Kumar et al. |
| 6,982,946 | B2 | 1/2006 | Wiberg et al. |
| 6,987,798 | B2 | 1/2006 | Ahn et al. |
| 6,996,763 | B2 | 2/2006 | Sarkar et al. |
| 7,006,429 | B2 | 2/2006 | Yoshida et al. |
| 7,012,912 | B2 | 3/2006 | Naguib et al. |
| 7,016,651 | B1 | 3/2006 | Narasimhan |
| 7,031,741 | B2 | 4/2006 | Lee et al. |
| 7,047,473 | B2 | 5/2006 | Hwang et al. |
| 7,050,406 | B2 | 5/2006 | Hsu et al. |
| 7,054,275 | B2 | 5/2006 | Kim et al. |
| 7,061,986 | B2 | 6/2006 | Tonissen et al. |
| 7,068,702 | B2 | 6/2006 | Chen et al. |
| 7,069,038 | B2 | 6/2006 | Hakkinen et al. |
| 7,072,315 | B1 | 7/2006 | Liu et al. |
| 7,076,001 | B2 | 7/2006 | Beadle et al. |
| 7,092,706 | B2 | 8/2006 | Yang |
| 7,099,397 | B2 | 8/2006 | Lee et al. |
| 7,103,021 | B2 | 9/2006 | Jou |
| 7,120,134 | B2 | 10/2006 | Tiedemann, Jr. et al. |
| 7,126,928 | B2 | 10/2006 | Tiedemann, Jr. et al. |
| 7,126,930 | B2 | 10/2006 | Pankaj et al. |
| 7,149,199 | B2 | 12/2006 | Sung et al. |
| 7,155,236 | B2 | 12/2006 | Chen et al. |

(56) References Cited

U.S. PATENT DOCUMENTS

| | | |
|---|---|---|
| 7,158,504 B2 | 1/2007 | Kadaba et al. |
| 7,164,669 B2 | 1/2007 | Li et al. |
| 7,177,367 B2 | 2/2007 | Storm |
| 7,187,646 B2 | 3/2007 | Schramm |
| 7,190,964 B2 | 3/2007 | Damnjanovic et al. |
| 7,197,085 B1 | 3/2007 | Vella-Coleiro |
| 7,215,930 B2 | 5/2007 | Malladi |
| 7,245,600 B2 | 7/2007 | Chen |
| 7,257,101 B2 | 8/2007 | Petrus et al. |
| 7,269,186 B2 | 9/2007 | Abrol et al. |
| 7,269,389 B2 | 9/2007 | Petrus et al. |
| 7,272,199 B2 | 9/2007 | Storm et al. |
| 7,274,743 B2 | 9/2007 | Kim |
| 7,277,709 B2 | 10/2007 | Vadgama |
| 7,280,562 B2 | 10/2007 | Sindhushayana et al. |
| 7,286,558 B2 | 10/2007 | Kim et al. |
| 7,286,846 B2 | 10/2007 | Chen et al. |
| 7,289,529 B2 | 10/2007 | Sherman |
| 7,299,402 B2 | 11/2007 | Soong et al. |
| 7,313,167 B2 | 12/2007 | Yoon et al. |
| 7,315,527 B2 | 1/2008 | Wei et al. |
| 7,317,711 B2 | 1/2008 | Bae et al. |
| 7,327,716 B2 | 2/2008 | Fong et al. |
| 7,336,640 B2 | 2/2008 | McDonough et al. |
| 7,336,954 B2 | 2/2008 | Wang et al. |
| 7,418,064 B2 | 8/2008 | Wei et al. |
| 7,423,992 B2 | 9/2008 | Iwamura |
| 7,437,648 B2 | 10/2008 | Sarkar et al. |
| 7,447,258 B2 | 11/2008 | Pietila et al. |
| 7,447,287 B1 | 11/2008 | Parantainen |
| 7,463,702 B2 | 12/2008 | Ammer et al. |
| 7,505,780 B2 | 3/2009 | Wei et al. |
| 7,600,170 B2 | 10/2009 | Gaal et al. |
| 7,706,403 B2 | 4/2010 | Hosein |
| 8,023,950 B2 | 9/2011 | Malladi et al. |
| 8,081,598 B2 | 12/2011 | Malladi et al. |
| 8,150,407 B2 | 4/2012 | Ho et al. |
| 2001/0012271 A1 | 8/2001 | Berger |
| 2001/0021180 A1 | 9/2001 | Lee et al. |
| 2001/0055287 A1 | 12/2001 | Sawada et al. |
| 2002/0012334 A1 | 1/2002 | Strawczynski et al. |
| 2002/0018446 A1 | 2/2002 | Huh et al. |
| 2002/0021683 A1 | 2/2002 | Holtzman et al. |
| 2002/0021692 A1 | 2/2002 | Huh et al. |
| 2002/0042283 A1 | 4/2002 | Moulsley |
| 2002/0051432 A1 | 5/2002 | Shin |
| 2002/0057730 A1 | 5/2002 | Karlsson et al. |
| 2002/0093918 A1 | 7/2002 | Kim et al. |
| 2002/0111183 A1 | 8/2002 | Lundby |
| 2002/0131522 A1 | 9/2002 | Felgentreff |
| 2002/0136271 A1 | 9/2002 | Hiramatsu et al. |
| 2002/0137521 A1 | 9/2002 | Kim et al. |
| 2002/0150077 A1 | 10/2002 | Temerinac |
| 2002/0160767 A1 | 10/2002 | Hanly |
| 2002/0167907 A1 | 11/2002 | Sarkar et al. |
| 2002/0172192 A1 | 11/2002 | Hunzinger et al. |
| 2002/0176362 A1 | 11/2002 | Yun et al. |
| 2002/0183039 A1 | 12/2002 | Padgett et al. |
| 2003/0028251 A1 | 2/2003 | Mathews |
| 2003/0031130 A1 | 2/2003 | Vanghi |
| 2003/0039317 A1 | 2/2003 | Taylor et al. |
| 2003/0067899 A9 | 4/2003 | Chen et al. |
| 2003/0081538 A1 | 5/2003 | Walton et al. |
| 2003/0123392 A1 | 7/2003 | Ruutu et al. |
| 2003/0129981 A1 | 7/2003 | Kim |
| 2003/0137953 A1 | 7/2003 | Chae et al. |
| 2003/0142656 A1* | 7/2003 | Padovani et al. ............... 370/347 |
| 2003/0152102 A1 | 8/2003 | Morgan et al. |
| 2003/0219037 A1 | 11/2003 | Toskala et al. |
| 2004/0001536 A1 | 1/2004 | Lohtia et al. |
| 2004/0013102 A1 | 1/2004 | Fong et al. |
| 2004/0101035 A1 | 5/2004 | Boer et al. |
| 2004/0137931 A1 | 7/2004 | Sarkar et al. |
| 2004/0158790 A1 | 8/2004 | Gaal et al. |
| 2004/0160922 A1 | 8/2004 | Nanda et al. |
| 2004/0160933 A1 | 8/2004 | Odenwalder et al. |
| 2004/0203973 A1 | 10/2004 | Khan |
| 2004/0224711 A1 | 11/2004 | Panchal et al. |
| 2004/0228288 A1 | 11/2004 | Seol et al. |
| 2004/0228349 A1 | 11/2004 | Vrzic et al. |
| 2004/0228389 A1 | 11/2004 | Odenwalder |
| 2005/0002324 A1 | 1/2005 | Sutivong et al. |
| 2005/0004970 A1 | 1/2005 | Jain et al. |
| 2005/0007986 A1 | 1/2005 | Malladi et al. |
| 2005/0030911 A1 | 2/2005 | Tiedemann et al. |
| 2005/0176456 A1 | 8/2005 | Chen et al. |
| 2005/0254465 A1 | 11/2005 | Lundby et al. |
| 2006/0007892 A1 | 1/2006 | Sudo |
| 2006/0019701 A1 | 1/2006 | Ji |
| 2006/0128410 A1 | 6/2006 | Derryberry et al. |
| 2006/0156166 A1 | 7/2006 | Sarkar et al. |
| 2006/0165126 A1 | 7/2006 | Petersson et al. |
| 2006/0183497 A1 | 8/2006 | Paranchych et al. |
| 2006/0215737 A1 | 9/2006 | Bang et al. |
| 2006/0264220 A1 | 11/2006 | Chen et al. |
| 2007/0030820 A1 | 2/2007 | Sarkar et al. |
| 2007/0111669 A1 | 5/2007 | Malladi |
| 2007/0206623 A1 | 9/2007 | Tiedemann et al. |
| 2008/0043683 A1 | 2/2008 | Kwon et al. |
| 2008/0194286 A1 | 8/2008 | Chen et al. |
| 2009/0052573 A1 | 2/2009 | Tiedemann, Jr. et al. |
| 2009/0083602 A1 | 3/2009 | Sarkar et al. |
| 2010/0135156 A1 | 6/2010 | Sarkar |
| 2011/0009066 A1 | 1/2011 | Malladi |
| 2013/0022004 A1 | 1/2013 | Chen et al. |

FOREIGN PATENT DOCUMENTS

| | | |
|---|---|---|
| EP | 627827 A2 | 12/1994 |
| EP | 0771084 A1 | 5/1997 |
| EP | 0783210 A2 | 7/1997 |
| EP | 0809364 A2 | 11/1997 |
| EP | 0912016 A2 | 4/1999 |
| EP | 0921652 A2 | 6/1999 |
| EP | 0996304 A1 | 4/2000 |
| EP | 1104127 | 5/2001 |
| EP | 1168703 A2 | 1/2002 |
| EP | 1231807 A2 | 8/2002 |
| EP | 1248417 A2 | 10/2002 |
| EP | 1257140 A1 | 11/2002 |
| EP | 1292057 A1 | 3/2003 |
| EP | 1326471 | 12/2008 |
| GB | 2301687 A | 12/1996 |
| GB | 2352944 A | 2/2001 |
| JP | 4111553 A | 4/1992 |
| JP | 6350562 A | 12/1994 |
| JP | 08298498 A | 12/1996 |
| JP | 09312629 | 12/1997 |
| JP | 10013325 A | 1/1998 |
| JP | 11098120 A | 4/1999 |
| JP | 11154919 A | 6/1999 |
| JP | 11196043 | 7/1999 |
| JP | 11508417 T | 7/1999 |
| JP | 2000299680 A | 10/2000 |
| JP | 2000513549 | 10/2000 |
| JP | 2000349740 | 12/2000 |
| JP | 2001016139 A | 1/2001 |
| JP | 2001036500 A | 2/2001 |
| JP | 2001238269 A | 8/2001 |
| JP | 2001515300 T | 9/2001 |
| JP | 2001517017 | 10/2001 |
| JP | 2001523918 | 11/2001 |
| JP | 2002009734 A | 1/2002 |
| JP | 2002026808 A | 1/2002 |
| JP | 200277984 | 3/2002 |
| JP | 2002508137 T | 3/2002 |
| JP | 2002508896 T | 3/2002 |
| JP | 2002159061 A | 5/2002 |
| JP | 2002522988 T | 7/2002 |
| JP | 2002232943 A | 8/2002 |
| JP | 2002528954 T | 9/2002 |
| JP | 2002531992 | 9/2002 |
| JP | 2002534020 | 10/2002 |
| JP | 2002539672 A | 11/2002 |

(56) References Cited

FOREIGN PATENT DOCUMENTS

| | | |
|---|---|---|
| JP | 2003008521 A | 1/2003 |
| JP | 2003018117 | 1/2003 |
| JP | 2003032218 A | 1/2003 |
| JP | 2003060606 A | 2/2003 |
| JP | 2003060609 A | 2/2003 |
| JP | 2003069523 A | 3/2003 |
| JP | 2004032518 A | 1/2004 |
| JP | 2004166038 A | 6/2004 |
| JP | 2004214746 A | 7/2004 |
| JP | 2004320679 A | 11/2004 |
| JP | 2005505168 | 2/2005 |
| JP | 2005505955 T | 2/2005 |
| JP | 2008072733 A | 3/2008 |
| JP | 4824556 B2 | 11/2011 |
| KR | 19960015862 | 11/1996 |
| KR | 0156478 B1 | 11/1998 |
| KR | 100214293 | 5/1999 |
| KR | 20020074739 A | 10/2002 |
| KR | 20020076991 | 10/2002 |
| KR | 20020085674 A | 11/2002 |
| KR | 20020089164 | 11/2002 |
| KR | 20020092136 | 12/2002 |
| KR | 100406531 | 11/2003 |
| RU | 2073913 C1 | 2/1997 |
| RU | 2111619 | 5/1998 |
| RU | 2115246 C1 | 7/1998 |
| RU | 2120198 C1 | 10/1998 |
| RU | 2145775 C1 | 2/2000 |
| RU | 2149518 | 5/2000 |
| RU | 2183910 C2 | 6/2002 |
| RU | 2189696 C2 | 9/2002 |
| TW | 477129 | 2/2002 |
| TW | 481963 | 4/2002 |
| TW | 504914 | 10/2002 |
| WO | WO9205556 | 4/1992 |
| WO | WO9507578 | 3/1995 |
| WO | WO9510144 A1 | 4/1995 |
| WO | WO9512297 | 5/1995 |
| WO | WO9701256 A1 | 1/1997 |
| WO | WO9733399 A1 | 9/1997 |
| WO | WO9835525 | 8/1998 |
| WO | WO9836606 | 8/1998 |
| WO | WO9845966 | 10/1998 |
| WO | WO9901994 | 1/1999 |
| WO | WO9904525 | 1/1999 |
| WO | WO997089 A1 | 2/1999 |
| WO | WO9912282 A1 | 3/1999 |
| WO | WO9926371 | 5/1999 |
| WO | WO9929054 A1 | 6/1999 |
| WO | WO0008869 A2 | 2/2000 |
| WO | WO0038368 A1 | 6/2000 |
| WO | WO0038444 | 6/2000 |
| WO | WO0042752 A1 | 7/2000 |
| WO | WO0048328 A1 | 8/2000 |
| WO | WO0054437 | 9/2000 |
| WO | WO0065743 A1 | 11/2000 |
| WO | WO0072622 | 11/2000 |
| WO | WO0106714 | 1/2001 |
| WO | WO0110159 | 2/2001 |
| WO | WO0117158 | 3/2001 |
| WO | WO0124568 | 4/2001 |
| WO | WO0128127 | 4/2001 |
| WO | WO0128194 | 4/2001 |
| WO | WO0141318 A2 | 6/2001 |
| WO | WO0180475 | 10/2001 |
| WO | WO0199303 | 12/2001 |
| WO | WO0199312 | 12/2001 |
| WO | WO0201762 | 1/2002 |
| WO | WO0223792 A1 | 3/2002 |
| WO | WO0231991 | 4/2002 |
| WO | WO0233838 | 4/2002 |
| WO | WO0237693 A2 | 5/2002 |
| WO | WO0237872 A2 | 5/2002 |
| WO | WO0239595 | 5/2002 |
| WO | WO0241531 | 5/2002 |
| WO | 0249305 A2 | 6/2002 |
| WO | WO0245327 | 6/2002 |
| WO | WO02060142 A2 | 8/2002 |
| WO | WO02063818 A1 | 8/2002 |
| WO | WO02065664 A2 | 8/2002 |
| WO | WO02080400 A2 | 10/2002 |
| WO | WO02082108 A1 | 10/2002 |
| WO | WO02095960 A2 | 11/2002 |
| WO | WO03003592 | 1/2003 |
| WO | WO03007530 A2 | 1/2003 |
| WO | 03028251 A1 | 4/2003 |
| WO | WO03084163 A1 | 10/2003 |
| WO | WO2005/015942 | 2/2005 |

OTHER PUBLICATIONS

Schreiber W F: "Spread- Spectrum Television Broadcasting", SMPTE Journal, SMPTE Inc. Scarsdale, N.Y, US, vol. 101, No. 8, Aug. 1, 1992, pp. 538-549, XP000296026, ISSN: 0036-1682.
Taiwanese Search report—093103844—TIPO—Oct. 21, 2010.
3G TS 25.211 "Physical channels and mapping of transport channels onto physical channels (FDD)", Release 5, V5.0.0, Mar. 2002.
3G TS 25.212 "Multiplexing and channel coding (FDD)", Release 5, V5.0.0, Mar. 2002.
3G TS 25.213 "Spreading and modulation (FDD)", Release 5, V5.0.0, Mar. 2002.
3G TS 25.214 "Physical layer procedures (FDD)", Release 5, V5.0.0, Mar. 2002.
3GPP2 C.S0024, Version 2.0: "cdma2000 High Rate Packet Data Air Interface Specification," pp. 1-441 (Oct. 27, 2000).
3GPP2 C.S0024: "cdma2000 High Rate Packet Data Air Interface Specification" 3GPP Standards, Sep. 12, 2000, XP002206456.
3rd Generation Partnership Proect, Technical Specification Group Radio Access Network: 3GPP TS 25.322 V4.7.0; Radio Access Link Control (RLC) Protocol Specification; Release 4, Dec. 2002, pp. 1-76.
Attar, R. A., et al., "A Reverse Link Outer-Loop Power Control Algorithm for CDMA2000 1xEV Systems" ICC 2002. 2002 IEEE International Conference on Communications. Conference Proceedings. New York, NY, Apr. 28-May 2, 2002, IEEE International Conference on Communications, New York, NY: IEEE, US, vol. 1 of 5 Apr. 28, 2002 pp. 573-578, XP010589559, ISBN: 0-7803-7400-2.
Chakravarty S et al: "An Algorithm for Reverse Traffic Channel Rate Control for cdma2000 High Rate Packet Data Systems" IEEE Global Telecommunications Conferenc, 2001. Globecom 01. E. San Antonio, TX, Nov. 25-29, 2001, IEEEGLOBAL Telecommunications Conference , New York, NY : IEEE, US, vol. 6 of 6, Nov. 25, 2001, pp. 3733-3737, XP002277693.
Chen, Tau, "Method and Apparatus for Forward Link Power Control During Soft Handoff in a Communication System", U.S. Appl. No. 60/356,929 entitled, filed Feb. 12, 2002, QUALCOMM Incorporated.
ETSI TS 125.211 v3.5.0 (Dec. 2000);Universal Mobile Telecommunications Systems (UMTS); Physical channels and mapping of transport channels onto physical channels (FDD), 3GPP TS 25.211 version 3.5.0 Release 1999).
European Search Report—EP10172964 ,Search Authority—Berlin Patent Office, Sep. 28, 2010.
Fujii, T. et al., "Best Effort Cell Structure Using Sub-carrier Selection MC-CDMA System," The Institute of Electronics, Information, and Communication Engineers, Nov. 15, 2002, vol. 102, No. 465, pp. 65-72, IEICE Technical Report RCS 2002-203 (English Abstract).
Gyung-Ho Hwang and Dong-Ho Cho, Distributed Rate Control for Throughput Maximization and QoS Support in WCDMA System, IEEE VTC, U.S. IEEE, Oct. 7, 2001, vol. 3, pp. 1721-1725.
Hamaguchi, et al., "Characteristics of Orthogonal Slow-FH/16QAM method applying Interference-resistant Demodulation," Proceedings of Inst. Of Electronics, Information and Communication Engineers, B-II, Jun. 25, 1995, vol. J78, B-II, No. 6, pp. 445-453.
International Search Report and Written Opinion—PCT/US04/004668, International Search Authority-European Patent Office—Sep. 27, 2004.

(56) References Cited

OTHER PUBLICATIONS

International Search Report and Written Opinion-PCT/US04/006759, International Search Authority-European Patent Office—Nov. 5, 2004.
"Mobile Station-Base Station Compatibility Standard for Wideband Spread Spectrum Cellular Systems," TIA/EIA Interim Standard, Feb. 3, 1999, XP002145331, pp. 6-380,6 (TIA/EIA-95-B).
Nadagopal T., et al., "Service Differentiation Through End-To-End Rate Control in Low Bandwith Wireless Packet Networks," 1999. IEEE International Workshop. San Diego CA USA Nov. 15-17, 1999, Mobile Mutlimedia Communications 1999, 211-220.
Sarkar S et al., "Adaptive Control of the Reverse Link in CDMA2000", International Journal of Wireless Information Networks, Plenum Press, NY, US, vol. 9, No. 1/1/2002, pp. 55-70, XP002300880, ISSN: 1068-9605.
Sarkar S., et al., "CDMA2000 Reverse Link: Design and System Performance" VTC 2000-Fall. IEEE VTS 52nd, Vehicular Technology Conference, Boston, MA, Sep. 24-28, 2000. vol. 6 of 6 Conf. 52, pp. 2713-2719,XP010525079.
Sklar, B. "Digital Communications, Fundamentals and Applications", 4 pages, 2001. Prentice-Hall PTR. Upper Saddle River, New Jersey, USA.
Sohn et al., "Blind Rate Detection Algorithm in WCDMA Mobile Receiver", IEEE 54th Vehicular Technology Conference Proceedings, Atlantic City, NJ, Oct. 7, 2001, pp. 1589-1592.
Sunay, M. Oguz, et al., "Provision of Variable Data Rates in Third Generation Wideband DS CDMA Sytems" Wireless Communications and Networking Conference, 1999. WCNC. 1999 IEEE New Orleans, LA, USA, Sep. 21-24, 1999, pp. 505-509, XP010353838.
"The cdma2000 ITU-R RTT Candidate Submission (0.18)," Telecommunications Industry Association TIA, Jul. 27, 1998, XP002294165, pp. 1-145.
TIA EIE interim Standard IS-856-1, 'CDMA.2000 High Rate Packet Data Air Interface Specification,' Addendum 1, Jan. 2002. pp. 9-23-9-57, XP002299790.
TIA/EIA-95; "Mobile Station-Base Station Compatibility Standard for Wideband Spread Spectrum Celluar Systems"(Mar. 1999).
TIA/EIA-IS-2000 Release C, "Introduction to cdma2000 Standards for Spread Spectrum Systems, Release C" (3GPP2 C.S0001-C, Version 1.0) May 28, 2002.
"Universal Mobile Telecommunications System (UMTS); Physical channels and mapping of transport channels onto physical channels (FDD) (3GPP TS 25.211 version 5.3.0 Release 5)", ETSI TS 125 211 v 5.3.0, Dec. 2002, pp. 1-52.
You Y-H., et al., "MC-VSG BNET System for High-Rate Wireless Personal Area Network Applications, New York US," IEEE Transactions on Consumer Electronics, IEEE Inc., vol. 48, No. 2, May 2002, pp. 254-264.
Young-Joo Song et al. "Rate-control Snoop : A Reliable Transport Protocol for Heterogeneous Networks with Wired and Wireless Links", IEEE Proceedings 2003, vol. 2, Mar. 16, 2003, pp. 1334-1338.
Young-UK Chung et al, "An Efficient Reverse Link Data Rate Control Scheme for 1xEV-DV System," IEEE 54TH. Vehnicular Technology Conference Proceedings. Atlantic City, NJ, Oct. 7-11, 2001. IEEE, US. vol. 1 of 4, Conf. 54, Oct. 10, 2001, pp. 820-823.
European Search Report—EP10178999, Search Authority—Munich Patent Office, Nov. 11, 2010.
Translation of Office Action in Japanese application 2006-522734 corresponding to U.S. Appl. No. 10/783,083, citing JP2002534020 dated Jan. 25, 2011.
Supplementary European Search Report—EP04752264—Search Authority—Berlin—Jun. 22, 2011.
Taiwan Search Report—TW093106052—TIPO—Mar. 28, 2011.
Brouwer A E et al:"An Updated Table of Minimum-Distance Bounds for Binary Linear Codes" IEEE Transactions on Information Theory, IEEE Service Center, Piscataway, NJ, US, vol. 39, No. 2, Mar. 1, 1993 pp. 662-677, XP000377724 ISSN: 0018-9448.
Macwilliams F. J.; Sloane N.J.A.: "The Theory of Error-Correcting Codes, pp. 23, 24"1977, North-Holland, Amsterdam, XP002366024..
Morelos-Zaragoza R. H.: "The Art of Error Correcting Coding, pp. 101-120" 2002, John Wiley and Sons, New York, XP002366026.
Morelos-Zaragoza R.N.: "The Art of Error Correcting Coding, pp. 16, 35" 2002, John Wiley and Sons, New York, XP002366025.
Strawczynski et al. "Multi User Frame Structure for 1XEV Forward Link," 3GPP2 cdma2000 TSG-C, Nortel Networks, 2000, pp. 1-6.
Balasubramanian S. et al., "QoS support for Enhanced Reverse Link-Control and Feedback", 3GPP2-Drafts, 2500 Wilson Boulevard, Suite 300, Arlington, Virginia 22201 USA, [Online] Sep. 15, 2003, pp. 1-18, XP040345576, Retrieved from the Internet: URL: http:I/ftp.3gpp2.org/TSGC/working/2003/2003-09-Calagry/TSGC-0309Calgary/WG3/[retrieved on Sep. 18, 2012).
Soong, A., "Reverse Link enhancements for CDMA2000 1x Revision D (E-REX) R1", 3GPP2-Drafts, 2500 Wilson Boulevard, Suite300, Arlington, Virginia 22201 USA, [Online] Feb. 17, 2003, pp. 1-14, XP040264591, Retrieved from the Internet: URL:http://ftp.3gpp2.org/TSGC/working/2003/2003-02-LosAngelas/TSG-C-2003-02-LA/WG3/[retrieved on Sep. 19, 2012].
Wei, Y. et al., "Qualcomm's Interpretation of the MAC Logic for the Harmonized Control Mechanism", 3GPP2-Drafts, 2500 Wilson Boulevard, Suite 300, Arlington, Virginia 22201 USA, [Online] Aug. 18, 2003, pp. 1-9, XP040264988, Retrieved from the Internet: URL:http://ftp.3gpp2.org/TSGC/working/2003/2003-08-Seoui/TSG-C-2003-08-Seou I/WG3/C30-20030818-067-Detailed%20Control%20Mechanism.pdf[retrieved on Sep. 18, 2012].
Yoon Y et al.,"Reverse Link Enhancements for CDMA2000 1x Revision D (E-REX) R2", 3GPP2-Drafts, 2500 Wilson Boulevard, Suite 300, Arlington, Virginia 22201 USA, Aug. 18, 2003, pp. 1-38, XP040264985, Retrieved from the Internet: URL: http://ftp.3gpp2.org/TSGC/working/2003/2003-08-Seoul/TSG-C-2003-08 Seoui/WG3/C30-20030818-012%20 E-REX%2011%20writeup.pdf [retrieved on Sep. 18, 2012].
European Search Report—EP10175490—Search Authority—Berlin—Nov. 23, 2010.

\* cited by examiner

SYSTEMS AND METHODS FOR USING CODE SPACE IN SPREAD-SPECTRUM COMMUNICATIONS

CLAIM OF PRIORITY UNDER 35 U.S.C. §119 AND 35 U.S.C. §120

The present Application for Patent is a continuation and claims priority to patent application Ser. No. 10/783,771 filed Feb. 20, 2004 which claims priority to Provisional Application No. 60/452,790 filed Mar. 6, 2003, and Provisional Application No. 60/470,770 filed May 14, 2003, and are assigned to the assignee hereof and hereby expressly incorporated by reference herein.

BACKGROUND

1. Field

The present invention relates generally to telecommunications systems, and more specifically to systems and methods for using direct-sequence codes to spread data over a broad frequency spectrum.

2. Background

Wireless communication technologies are rapidly advancing, and wireless communication systems are utilized to provide a larger and larger portion of the communications capacity that is currently available to users. This is true despite the additional technological impediments that are faced in implementing a wireless communication system, as compared to a wireline system.

One type of wireless communication system comprises a cellular CDMA (code division multiple access) system that is configured to support voice and data communications. This system may have multiple base stations that communicate via wireless channels with multiple mobile stations. (The base stations are also typically coupled via wireline networks to various other systems, such as a public switched telephone network.) Each base station communicates with a set of mobile stations that are within a sector corresponding to the base station.

CDMA refers generally to a form of direct-sequence spread-spectrum communication. Spread-spectrum communication techniques are generally characterized by several features. One of these features is the fact that the spread-spectrum signal occupies much greater bandwidth than the minimum bandwidth that is actually necessary to send the transmitted data. The use of greater bandwidth provides a number of benefits, including greater immunity to interference and tolerance of access by multiple users. Another of the characterizing features is the fact that the spreading of the signal over greater bandwidth is accomplished by means of a spreading code that is independent of the data being transmitted. Another characterizing feature is the fact that the spread-spectrum receiver synchronizes itself with the spreading code in order to recover the transmitted data. The use of independent candidates and synchronous reception by receivers allows multiple users to utilize the system (and the same bandwidth) at the same time.

CDMA can be used to transmit various types of data, including digitized voice data, ISDN channels, modem data, and the like. This data is typically transmitted on one or more traffic channels and these traffic channels are combined and transmitted as a single CDMA channel. The traffic channels are typically selected to be orthogonal to each other so that interference from the other traffic channels is minimized. The steps involved in the transmission of a CDMA channel consist generally of error-control coding, interleaving, and modulating the data of each traffic channel, spreading each traffic channel by a code that produces orthogonal sequences of code channel symbols, combining the code channel symbols of the different traffic channels, covering the combined code channel symbols with a pseudorandom code at the chip rate, and filtering, amplifying, and transmitting the signal at the CDMA carrier frequency. Receiving the CDMA channel transmission consists generally of receiving and amplifying the signal, mixing the received signal with a local carrier in order to recover the spread-spectrum signal, generating a pseudorandom code identical to that used in transmission, correlating the signal with the pseudorandom code in order to extract the combined code channel symbols, correlating the sequence of combined code channel symbols with the orthogonal code for each traffic channel, and demodulating, deinterleaving, and error-control-decoding each traffic channel.

In one type of CDMA system, referred to as cdma2000, the particular codes that are utilized to spread the traffic channels comprise sequences that are known as Walsh codes. Walsh codes are useful in CDMA systems because, for example, these codes are orthogonal and therefore minimize interference between the other traffic channels from that user. The Walsh codes spread the sequences of modulated symbols on the traffic channels to obtain sequences of modulated symbols at up to the chip rate. The current cdma2000 system with a chip rate of 1,228,800 chips per second uses Walsh codes of $2^n$ symbols where n=2 to 7. A Walsh code of length $2^n$ uses a fraction $\frac{1}{2^n}$ of the total available Walsh space. For example, a length-4 Walsh code uses one fourth of the total Walsh space and all of the longer length Walsh codes derived from that length-4 Walsh code cannot be used to provide orthogonal sequences. Low-rate traffic channels with low modulation symbol rates can use long Walsh codes that only use a small fraction of the Walsh space without exceeding the maximum spread modulation symbol rate of 1,228,800 symbols per second. However, with high traffic channel data rates, short Walsh codes that use a large fraction of the Walsh space must be used. To obtain the best possible performance with high traffic channel data rates, it is important to use the Walsh space efficiently. The low-rate reverse link traffic channels that are currently defined for cdma2000 only utilize about one fourth of the available Walsh space and the Walsh space that they use is all derived from the same length-4 Walsh code. The cdma2000 system uses the remaining three fourths of the Walsh space for typically high-rate traffic channels. However, the cdma2000 system doesn't make the best use of this three fourths of the Walsh space at its highest data rates. When even higher data rates are used, there is an even more important need in the art for systems and methods for making maximum use of the remaining three fourths of the Walsh space, so that the additional Walsh space can be efficiently utilized to achieve the best possible system performance. This is true for cdma2000 systems, as well as for other types of wireless spread spectrum communication systems that use other types of codes.

A problem with efficiently using the available unused Walsh space is that the Walsh codes only use fractions of $\frac{1}{2^n}$ of Walsh space. So an approach for using three fourths of the Walsh space must be determined. One approach is to just use half of the Walsh space with a length-2 Walsh code. However, this would result is a lower data rate or a higher error-control code rate for the code channel, which is undesirable. Another approach would be to multiplex the high data rate traffic channel onto three length-4 Walsh codes. However, this results in a higher than necessary peak-to-average power ratio for the resulting Walsh spread traffic channel.

SUMMARY

Embodiments disclosed herein address the above stated needs by using a minimum number of different-length Walsh codes to utilize the maximum available Walsh space. By using fewer Walsh codes to spread the modulation symbols of the code channel, the peak-to-average power ratio of the traffic channel is improved, thereby improving the performance of the system.

Generally speaking, the invention comprises systems and methods for improving the performance of direct-sequence spread-spectrum communication systems. In one embodiment, a system uses Walsh codes to spread traffic channel data over a broad communication spectrum. The system comprises a CDMA communication channel with one or more traffic channels where the traffic channels utilize Walsh codes and corresponding portions of the available Walsh space and at least one of the traffic channels utilizes two or more different-length Walsh codes. The portions of the traffic channel data covered by the different Walsh codes are then combined and transmitted via the same CDMA communication channel.

One embodiment of the invention comprises a mobile station for use in a wireless communication system, wherein the mobile station is configured to transmit data over one or more traffic channels, including a traffic channel that utilizes at least two different-length Walsh codes. Data to be transmitted by the mobile station is processed to generate symbols, which are then demultiplexed into multiple symbol streams. The mobile station then spreads each of the symbol streams with a different Walsh code, adjusts the powers of the sequences so that the symbols on each of the sequences of any particular traffic channel have the same transmitted energy, and combines the covered symbols of all the traffic channels into a single data stream. The mobile station then transmits the data stream to a base station.

An alternative embodiment of the invention comprises a base station that is configured to receive a signal corresponding to a CDMA channel that uses multiple, different-length Walsh codes to spread the data for at least one of its traffic channels. The base station demultiplexes the signal into multiple streams of signals, each of which is despread with a different Walsh code. The different streams corresponding to each traffic channel are then combined to form a single symbol stream. The remainder of the receive process is performed in a conventional manner.

Numerous other embodiments are also possible.

DETAILED DESCRIPTION

One or more embodiments of the invention are described below. It should be noted that these and any other embodiments described below are exemplary and are intended to be illustrative of the invention rather than limiting.

As described herein, various embodiments of the invention comprise systems and methods for using direct-sequence codes to spread data over a broad frequency spectrum. Spread-spectrum communication systems use various mechanisms for spreading data over a broader bandwidth spectrum than is strictly necessary to send the data in order to improve the performance of the systems. CDMA (Code Division Multiple Access) communication systems use a direct-sequence mechanism to spread the bandwidth of the data signal to be transmitted. This mechanism utilizes pseudo-random codes that are combined with the data to generate a higher frequency signal. The subset of CDMA systems that are encompassed by the IS-2000 standard (also referred to as cdma2000 systems) use Walsh codes to spread the bandwidth of the data signal.

The low-rate reverse link traffic channels that were implemented in earlier CDMA communication systems (particularly in previous Revisions/Releases of the IS-2000 standard) used specific subsets of the available Walsh space. These subsets of the available Walsh space occupy about one quarter of the total Walsh space. More specifically, these codes occupy the $W^4_0$ Walsh space. The $W^m_k$ notation refers to the $k^{th}$ of m Walsh codes of length m where k=0 to m−1 and m=$2^n$ with n=1, 2, 3, . . . . When the $W^m_k$ Walsh code is used, the longer length Walsh codes derived from it (its descendants) are no longer available for other traffic channels. For example, the $W^{2m}_k$ and $W^{2m}_{k+m}$ Walsh codes that are directly derived from the $W^m_k$ Walsh code (the first descendants) are not available for other traffic channels when the $W^m_k$ Walsh code is used. Similarly, the $W^{4m}_k$, $W^{4m}_{k+m}$, $W^{4m}_{k+2m}$, and $W^{4m}_{k+3m}$ Walsh codes formed from the first two descendents (i.e., the second descendants) of the $W^m_k$ Walsh code are not available for other traffic channels, and so on. The $W^m_k$ Walsh space is the subset of the Walsh space that is used by the $W^m_k$ Walsh code and its descendants. So when the low-rate traffic channels all use Walsh codes that are descendants of the $W^4_0$ Walsh code, the remaining three quarters of the Walsh space are available for other traffic channels, such as high-rate traffic channels. Various embodiments of the present invention make use of these codes in a way that improves the performance of the respective systems. In particular, for a high-rate traffic channel, rather than using each of the remaining quarters of the Walsh space in connection with a corresponding Walsh code, a quarter of the Walsh space ($W^4_2$) is used in connection with a first new channel, while the remaining half of the Walsh space ($W^2_1$) is used in connection with a second new channel. By using these three quarters of the Walsh space in connection with two new channels formed from different-length Walsh codes instead of from three length-4 channels (one each, corresponding to $W^4_2$, $W^4_1$, and $W^4_3$), the peak-to-average ratio of the resultant CDMA channel is reduced, and the performance of the system is thereby improved.

It should be noted that, while the invention is described herein primarily with respect to systems that conform to the IS-2000 standard, alternative embodiments may conform to other standards or may make use of pseudo-random spreading codes other than Walsh codes (e.g., M sequences, Gold codes or Kasami codes). It is believed that the present disclosure will be understood by persons of ordinary skill in the art to extend to and enable such alternative embodiments, and such embodiments are intended to be covered by the appended claims.

A preferred embodiment of the invention is implemented in a wireless communication system that conforms generally to a release of the cdma2000 specification. cdma2000 is a 3rd Generation (3G) wireless communication standard that is based on the IS-95 standard. The cdma2000 standard has evolved and continues to evolve to continually support new services. The preferred embodiment of the invention is intended to be operable in systems utilizing Release D of the cdma2000 standard, but other embodiments may be implemented in other Releases of cdma2000 or in systems that conform to other standards (e.g., W-CDMA). The embodiments described herein should therefore be considered exemplary, rather than limiting.

Figure 1:
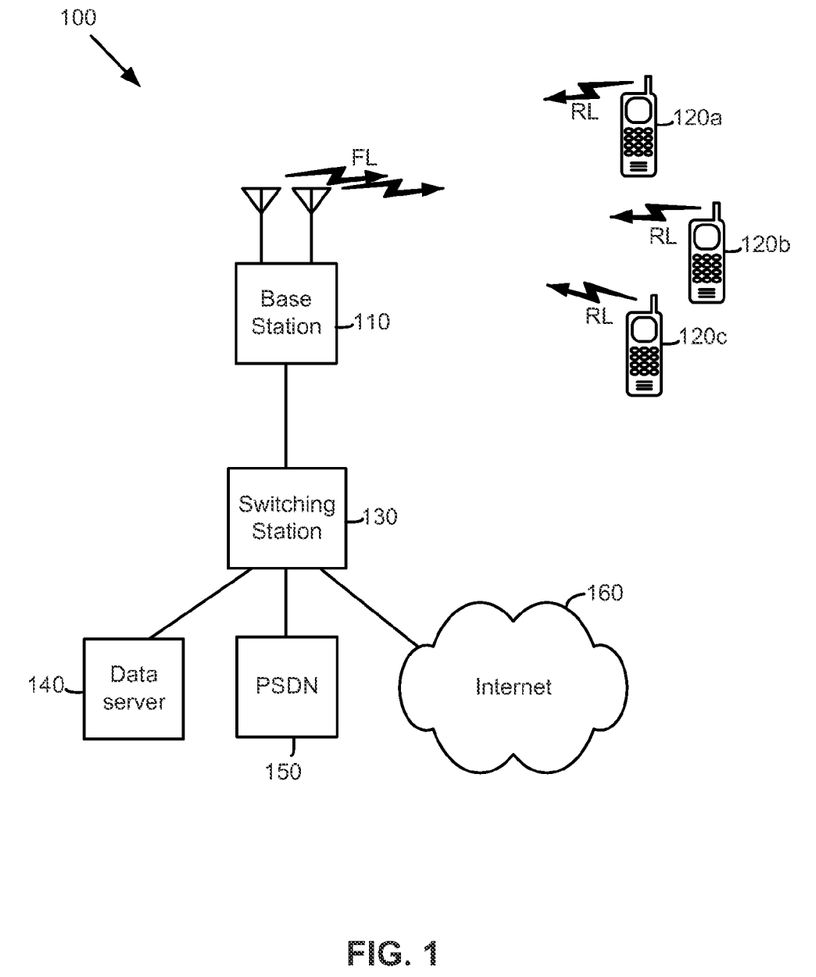
FIG. 1 is a diagram illustrating the structure of an exemplary wireless communications system in accordance with one embodiment.

Referring to FIG. 1, a diagram illustrating the structure of an exemplary wireless communications system is shown. As depicted in this figure, system 100 comprises a base station 110 that is configured to communicate with a plurality of mobile stations 120. Mobile stations 120 may, for example, be cellular telephones, personal information managers (PIMs or PDA), or the like that are configured for wireless communication. It should be noted that these devices need not actually be "mobile," but may simply communicate with base station 110 via a wireless link. Base station 110 transmits data to mobile stations 120 via corresponding forward link (FL) channels, while mobile stations 120 transmit data to base station 110 via corresponding reverse link (RL) channels.

It should be noted that, for the purposes of this disclosure, identical items in the figures may be indicated by identical reference numerals followed by a lowercase letter, e.g., 120a, 120b, and so on. The items may be collectively referred to herein simply by the reference numeral.

Base station 110 is also coupled to a switching station 130 via a wireline link. The link to switching station 130 allows base station 110 to communicate with various other system components, such as a data server 140, a public switched telephone network 150, or the Internet 160. It should be noted that the mobile stations and system components in this figure are exemplary and other systems may comprise other types and other combinations of devices.

While, in practice, the specific designs of base station 110 and mobile stations 120 may vary significantly, each serves as a wireless transceiver for communicating over the forward and reverse links. Base station 110 and mobile stations 120 therefore have the same general structure. This structure is illustrated in FIG. 2.

Figure 2:
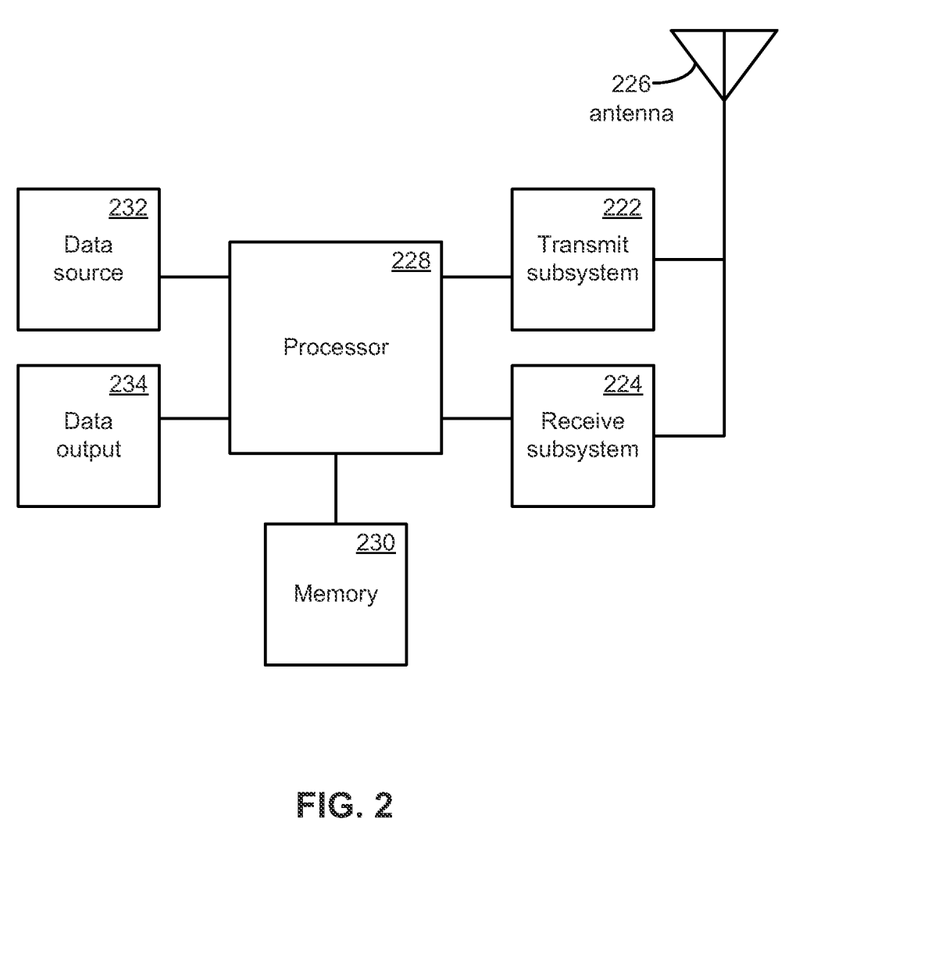
FIG. 2 is a functional block diagram illustrating the basic structural components of a wireless transceiver system in accordance with one embodiment.

Referring to FIG. 2, a functional block diagram illustrating the basic structural components of a wireless transceiver system in accordance with one embodiment is shown. As depicted in this figure, the system comprises a transmit subsystem 222 and a receive subsystem 224, each of which is coupled to an antenna 226. Transmit subsystem 222 and receive subsystem 224 may be collectively referred to as a transceiver subsystem. Transmit subsystem 222 and receive subsystem 224 access the forward and reverse links through antenna 226. Transmit subsystem 222 and receive subsystem 224 are also coupled to processor 228, which is configured to control transmit and receive subsystems 222 and 224. Memory 230 is coupled to processor 228 to provide working space and local storage for the processor. A data source 232 is coupled to processor 228 to provide data for transmission by the system. Data source 232 may, for example, comprise a microphone or an input from a network device. The data is processed by processor 228 and then forwarded to transmit subsystem 222, which transmits the data via antenna 226. Data received by receive subsystem 224 through antenna 226 is forwarded to processor 228 for processing and then to data output 234 for presentation to a user. Data output 234 may comprise such devices as a speaker, a visual display, or an output to a network device.

Persons of skill in the art of the invention will appreciate that the structure depicted in FIG. 2 is illustrative and that other embodiments may use alternative configurations. For example, processor 228, which may be a general-purpose microprocessor, a digital signal processor (DSP) or a special-purpose processor, may perform some or all of the functions of other components of the transceiver, or any other processing required by the transceiver. The scope of the claims appended hereto are therefore not limited to the particular configurations described herein.

Considering the structure of FIG. 2 as implemented in a mobile station, the components of the system can be viewed as a transceiver subsystem coupled to a processing subsystem, where the transceiver subsystem is responsible for receiving and transmitting data over a wireless channel and the processing subsystem is responsible for preparing and providing data to the transceiver subsystem for transmission and receiving and processing data that it gets from the transceiver subsystem. The transceiver subsystem could be considered to include transmit subsystem 222, receive subsystem 224, and antenna 226. The processing subsystem could be considered to include processor 228, memory 230, data source 232 and data output 234.

Figure 3:
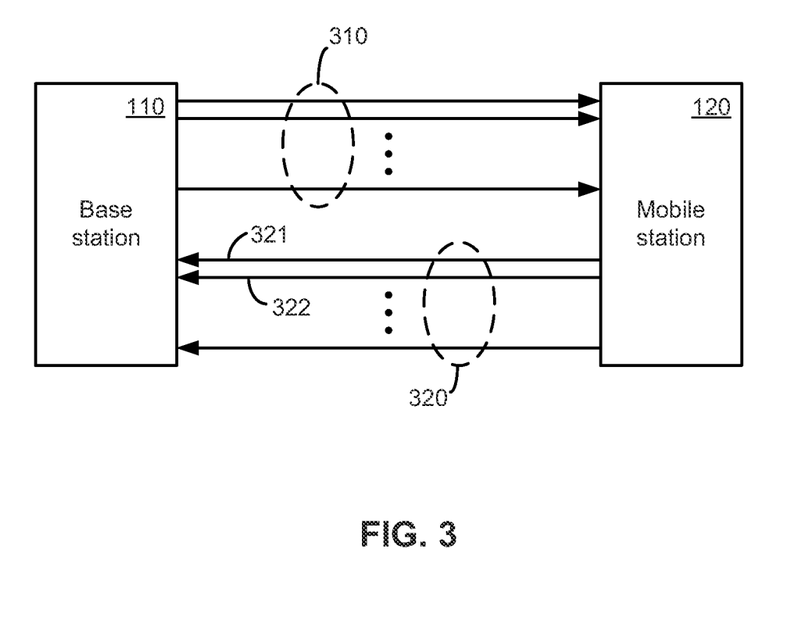
FIG. 3 is a diagram illustrating multiple channels between the mobile station and base station in accordance with one embodiment.

As indicated above, the communication link between the base station and the mobile station actually comprises various traffic channels. Referring to FIG. 3, a diagram illustrating multiple traffic channels between the mobile station and the base station is shown. As depicted in the figure, base station 110 transmits data to mobile station 120 via a set of forward link traffic channels 310. These traffic channels typically include traffic channels over which data is transmitted and traffic channels over which control information is transmitted. Forward link channels 310 may include, for example, a Forward Fundamental Channel (F-FCH) that may be used to transmit low-speed data, a Forward Supplemental Channel (F-SCH) that may be used for high-rate, point-to-point communications, or a Forward High-Speed Broadcast Channel (F-HSBCH) that may be used to broadcast messages to multiple recipients. The channels may also include a Forward Dedicated Control Channel (F-DCCH), a forward broadcast control channel (F-BCCH), or a Forward Paging Channel (F-PCH) that may be used to transmit control information relating to the other traffic channels or to other aspects of the operation of the system.

Mobile station 120 transmits data to base station 110 via a set of reverse link traffic channels 320. Again, these traffic channels typically include traffic channels that are used for transmitting data or control information. Mobile station 120 may transmit data back to the base station over such channels as a reverse access channel (R-ACH), an extended reverse access channel (R-EACH), a reverse request channel (R-REQCH), a reverse enhanced supplemental channel (R-ESCH), a reverse dedicated control channel (R-DCCH), a reverse common control channel (R-CCCH), or a reverse rate indicator channel (R-RICH).

In one embodiment, the R-ESCH is used to transmit high-rate data from the mobile station to the base station. Data can be transmitted over the R-ESCH at rates up to 1.5384 Mbps. The data is transmitted in 10-ms subpackets. The general structure of the R-ESCH is illustrated in FIG. 4.

Figure 4:
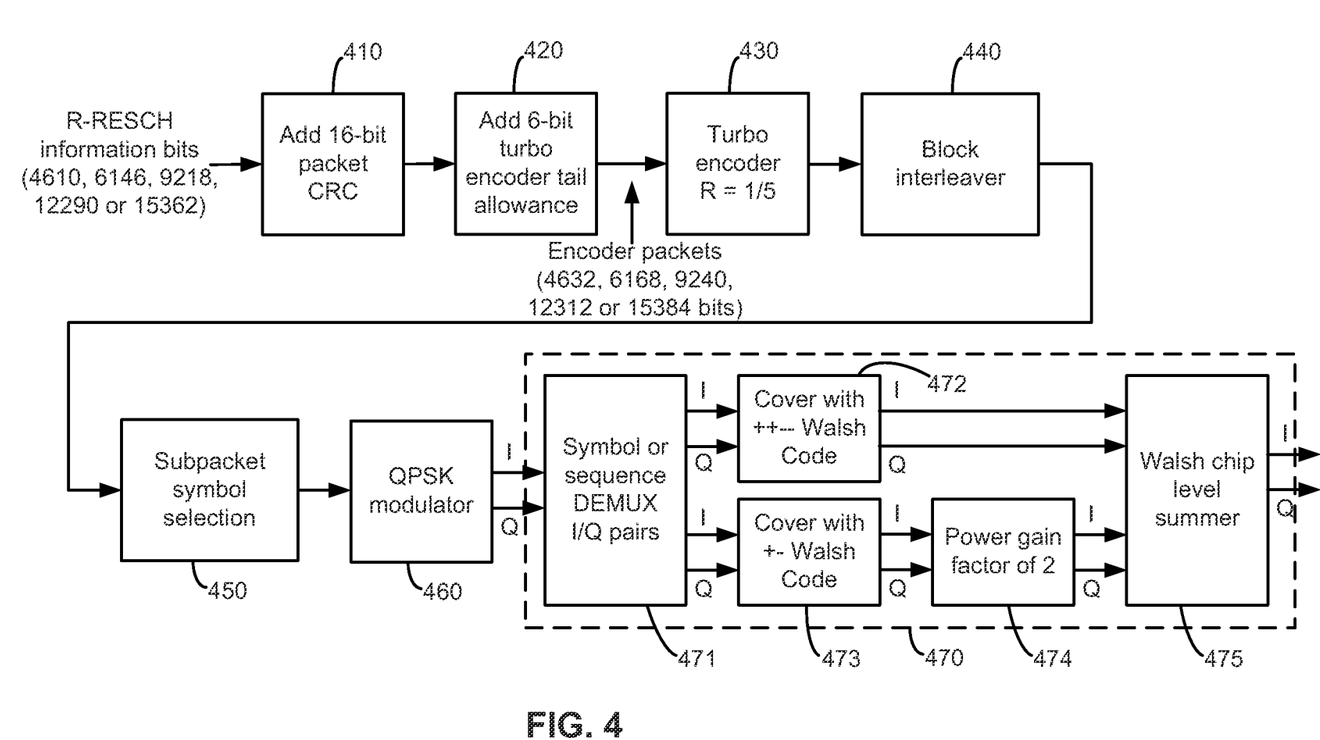
FIG. 4 is a functional block diagram illustrating the structure of a reverse-link enhanced supplemental channel (R-ESCH) for an encoder packet size of 4632, 6168, 9240, 12312, or 15384 bits in accordance with one embodiment.

Referring to FIG. 4, a functional block diagram illustrating the structure of the R-ESCH for encoder packet sizes of 4632, 6168, 9240, 12312, or 15384 bits is shown. It should be noted that, in this embodiment, this structure would vary somewhat when used in conjunction with other packet sizes. The structure may also vary in its implementation in other embodiments. The structure of FIG. 4 is merely exemplary of the possible structures. It should also be noted that the functional block diagram of FIG. 4 is illustrative of a method for processing data for transmission by a mobile station in accordance with one embodiment. It should be noted that the components illustrated in the functional block diagram, as well as the steps of the corresponding method, may be rearranged in other embodiments without departing from the scope of the invention.

As depicted in FIG. 4, a 16-bit packet CRC is first added in block 410 to the information bits that are to be transmitted. A 6-bit turbo encoder tail allowance is added in block 420, so that the encoder packet now has a size of 4632, 6168, 9240, 12312, or 15384 bits (corresponding to information packet sizes of 4610, 6146, 9218, 12290, or 15362 bits, respectively). Turbo encoding (block 430) and block interleaving (block 440) are then performed on the encoder packet. Symbols are then selected from the interleaved data in block 450, and the resulting symbols are modulated (block 460).

The symbols are then covered with the appropriate Walsh codes (block 470). In the embodiment depicted in FIG. 4, this is accomplished with a series of components comprising a symbol or sequence demultiplexer (block 471), components to cover the symbols with the appropriate Walsh codes (blocks 472 and 473), a power amplifier (block 474), and a chip-level summer (block 475).

In the traffic channel depicted by FIG. 4, demultiplexer 471 converts the single stream of symbols from modulator 460 and produces two separate streams. For the symbol DEMUX embodiment, one of the streams consists of every third symbol and it is processed in block 472 where the symbols are covered with the ++−− Walsh code and the other stream consists of the remainder of the symbols (two-thirds of the total) and they are processed in block 473 where the symbols are covered with the +− Walsh code. For the sequence DEMUX embodiment, one of the streams consists of the first one-third of the input symbols and they are processed in block 472 where the symbols are covered with the ++−− Walsh code and the other stream consists of the last two-thirds of the input symbols and they are processed in block 473 where the symbols are covered with the +− Walsh code. The symbols processed by block 473 are amplified in block 474 to provide a 2× power gain. The two separate symbols streams are then summed at block 475 to multiplex them back into a single stream for transmission.

As noted above, processing the data of the R-ESCH in this manner makes use of the entire three-quarters of the Walsh space that was available for the high-rate traffic channel, but only uses two Walsh channels. Those skilled in the art will recognize that the use of two Walsh channels instead of three will reduce the peak-to-average power ratio of the R-ESCH. Because the peak-to-average power ratio is reduced, the mobile station can operate its power amplifier closer to the saturation point and can thereby gain a range advantage.

It should be noted that the processing of data to be transmitted over the R-ESCH as described herein is intended to be exemplary rather than limiting. While the disclosed techniques can be used to utilize as much Walsh channel resources as possible by multiplexing a single traffic channel over multiple channels that use different-length Walsh codes to minimize the number of required Walsh channels, these techniques can be utilized with other types of channels and resources. The techniques used in the disclosed embodiments may be used with other channels as well. Alternative embodiments may implement these techniques in other reverse link channels or in forward link channels, and need not conform to cdma2000 or any other particular standard.

As noted above, a particular traffic channel (e.g., R-FCH) conventionally utilizes a single Walsh code. In such a traffic channel, the symbols can be covered by the appropriate Walsh code in a very straightforward manner. In the channel depicted in FIG. 4, however, two Walsh channels are used. Moreover, each of these channels uses different-length Walsh codes ($W^4_2$ and $W^2_1$, in this embodiment). It is therefore a more complex task to cover the symbols generated within the channel with the appropriate Walsh codes. Thus, block 470 of the channel in FIG. 4 must demultiplex the pairs (I and Q) of modulated symbols, cover some of the symbols with length-4 Walsh codes, cover the remainder of the symbols with length-2 Walsh codes, amplify the symbols covered with the length-2 Walsh code, and then recombine all of the covered symbols to produce the signal to be transmitted.

Figure 5:
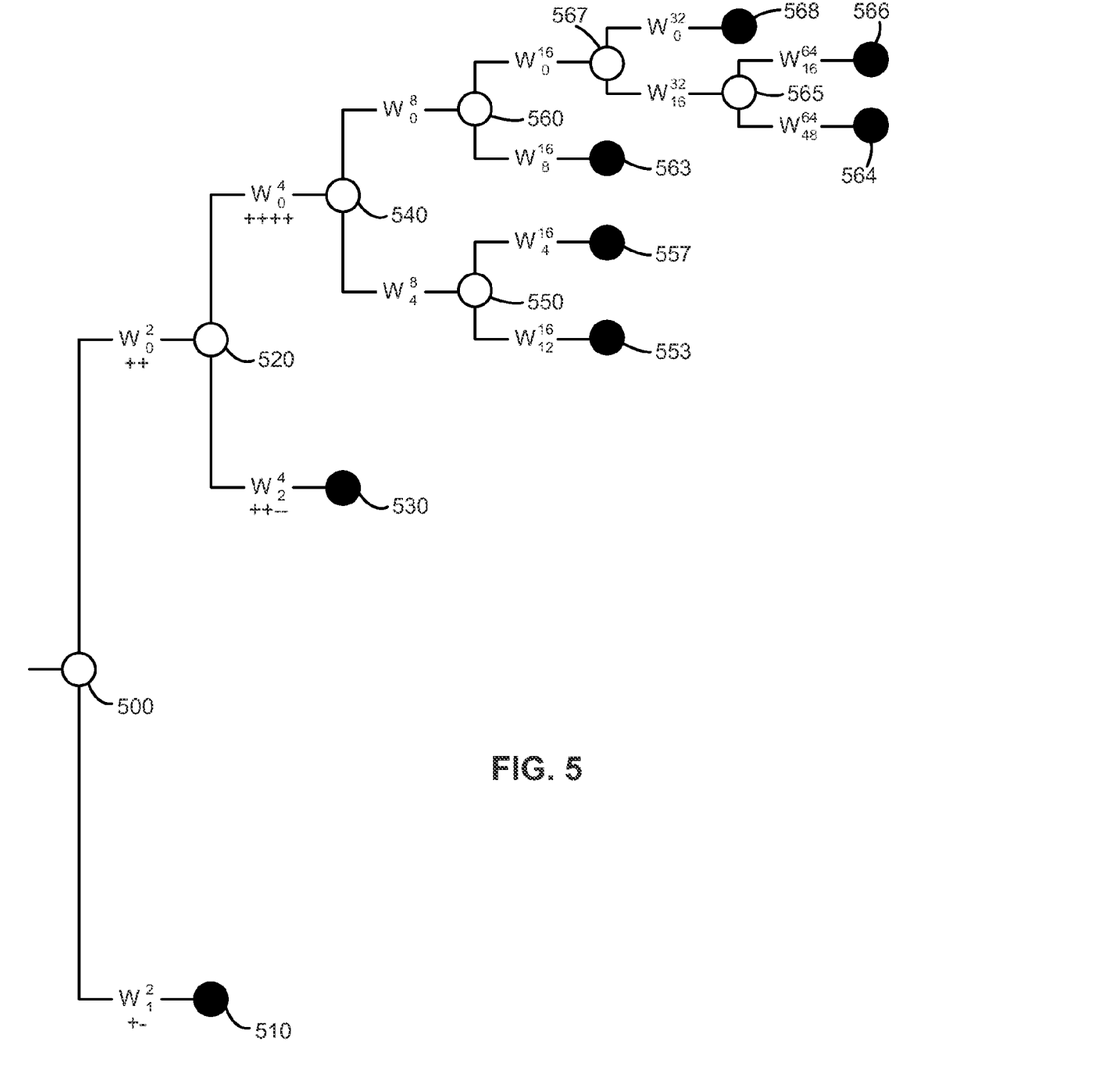
FIG. 5 is a Walsh tree illustrating the relationship of different Walsh codes (corresponding to different portions of the available Walsh space) in accordance with one embodiment.

As indicated above, the reverse link channel depicted in FIG. 4 uses both length-4 and length-2 Walsh codes. The reason for using these Walsh candidates is described with reference to FIG. 5. Referring to FIG. 5, a Walsh tree illustrating the relationship of different Walsh codes (corresponding to different portions of the available Walsh space) is shown. As depicted in this figure, the Walsh space (all of the possible Walsh codes) can be shown as a tree, with a number of branches, and leaves at the ends of some of the branches. Each branch of the Walsh tree corresponds to a subset of the possible Walsh codes. Thus, the top-level node 500 branches into two sets of length-2 codes (nodes 510 and 520, corresponding to codes $W^2_1$ and $W^2_0$, or +− and ++, respectively). Similarly, node 520 branches into two sets of length-4 codes (nodes 530 and 540), node 540 branches into two sets of length-8 codes (nodes 550 and 560), node 550 branches into two sets of length-16 codes (nodes 553 and 557), node 560 branches into two sets of length-16 codes (nodes 563 and 567), and so on.

The different Walsh codes corresponding to the different nodes of the Walsh tree are used to ensure that the corresponding channels are orthogonal. Once a particular node on the tree is used, it terminates the tree, and no further branches from that node can be used. For example, the Walsh codes corresponding to node 568 are used for the reverse pilot channel (R-PICH), so there can be no further branches from this node. On the other hand, the Walsh codes corresponding to node 565 are not used for any of the channels, so the tree branches to nodes 564 and 566, and Walsh codes corresponding to these nodes are available for use with the reverse rate indicator channel (R-RICH) and the reverse acknowledgment channel (R-ACKCH), respectively.

Most of the top quarter of the Walsh space is used by low-rate legacy traffic channels. These traffic channels and their corresponding Walsh codes and nodes of the Walsh tree of FIG. 5 are shown in the following table. The reverse enhanced supplemental channel (R-ESCH) uses the three quarters of the Walsh space corresponding to $W^4_2$ and $W^2_1$ (nodes 530 and 510, respectively), while the R-RICH (reverse rate indicator channel) that provides control information for the R-ESCH employs an unused Walsh code ($W^{64}_{48}$) in the already occupied top quarter of the Walsh tree of FIG. 5.

TABLE 1 legacy channels and use of Walsh space

| Channel | Walsh codes | Node in FIG. 5 |
|---------|-------------|----------------|
| R-FCH   | $W^{16}_4$  | 557 |
| R-CQICH | $W^{16}_{12}$ | 553 |
| R-DCCH  | $W^{16}_8$  | 563 |
| R-PICH  | $W^{32}_0$  | 568 |
| R-ACKCH | $W^{64}_{16}$ | 566 |

Conventionally, the covering of the symbols with a Walsh code in a traffic channel would be accomplished by taking the Walsh code that is appropriate for the traffic channel and modulating the symbols with the Walsh code. The resulting data would then be transmitted on the corresponding Walsh channel. Because it is intended for the R-ESCH in the present embodiment to use Walsh resources corresponding to three quarters of the Walsh space, however, more than a single Walsh channel must be used (no single Walsh channel covers all of the desired Walsh space without also covering the already-used Walsh space). Rather than using the Walsh codes for each of the three available quarters of the Walsh space ($W^4_2$, $W^4_1$, and $W^4_3$), in connection with three corresponding Walsh channels, only two Walsh channels and the corresponding Walsh codes ($W^4_2$ and $W^2_1$) are used. This is somewhat counter intuitive because it might be simpler to implement the use of Walsh codes that are all the same length (i.e., $W^4_n$) instead of different lengths ($W^4_2$ and $W^2_1$). The different length codes used in this embodiment, however, provide improved performance in that the use of fewer channels (two instead of three) results in a lower peak-to-average ratio.

The embodiment described utilizes three quarters of the Walsh space to cover the data transmitted over a reverse link data channel. As noted above, this embodiment may be implemented in a mobile station in a wireless communication system. An alternative embodiment may comprise a base station for receiving the data transmitted over the reverse link data channel and decoding the data. The process of decoding the data would essentially follow the reverse of the foregoing channel description. For instance, the received signal would be demultiplexed and decoded using the different-length Walsh codes to generate subpacket symbols, which would then be multiplexed into a single stream of symbols that could be decoded in a relatively conventional manner. The invention therefore includes embodiments that can be implemented with respect to both the transmission and reception of data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, comprising:
   receiving traffic channel data associated with a first traffic channel, wherein the traffic channel data includes a first set of symbols and a second set of symbols;
   covering the first set of symbols with a first spreading code of a first length to generate a first covered symbol stream at a processor;
   covering the second set of symbols with a second spreading code of a second length to generate a second covered symbol stream at the processor, wherein the second length is different from the first length;
   combining the first covered symbol stream and the second covered symbol stream into a combined stream; and
   transmitting the combined stream via a wireless communication channel.

2. The method of claim 1, wherein the first spreading code is a length-2 Walsh code that corresponds to one half of an available Walsh space, and wherein the second spreading code is a first length-4 Walsh code that corresponds to one quarter of the available Walsh space.

3. The method of claim 2, wherein the first traffic channel utilizes a first Walsh channel and a second Walsh channel, wherein the first Walsh channel uses the length-2 Walsh code, and wherein the second Walsh channel uses the first length-4 Walsh code.

4. The method of claim 3, wherein the length-2 Walsh code is +−, and wherein the first length-4 Walsh code is ++−−.

5. The method of claim 3, wherein the wireless communication channel is a code division multiple access (CDMA) channel, and wherein the first traffic channel is a high-rate traffic channel.

6. The method of claim 5, wherein the high-rate traffic channel is a reverse enhanced supplemental channel (R-ESCH).

7. The method of claim 6, wherein a plurality of low-rate traffic channels each use Walsh codes that are descendents of a second length-4 Walsh code that corresponds to a remaining quarter of the available Walsh space.

8. The method of claim 7, wherein the second length-4 Walsh code is ++++.

9. The method of claim 7, wherein the plurality of low-rate traffic channels includes a reverse rate indicator channel (R-RICH) that provides control information for the R-ESCH, and wherein the R-RICH uses a length-64 Walsh code.

10. The method of claim 1, wherein the traffic channel data is received at a mobile station and wherein the combined stream is transmitted from the mobile station to a base station via the wireless communication channel.

11. An apparatus, comprising:
a processor configured to:
receive traffic channel data associated with a first traffic channel, wherein the traffic channel data includes a first set of symbols and a second set of symbols;
cover the first set of symbols with a first spreading code of a first length to generate a first covered symbol stream;
cover the second set of symbols with a second spreading code of a second length to generate a second covered symbol stream, wherein the second length is different from the first length; and
combine the first covered symbol stream and the second covered symbol stream into a combined stream; and
a transmitter configured to transmit the combined stream via a wireless communication channel.

12. The apparatus of claim 11, wherein the first spreading code is a length-2 Walsh code that corresponds to one half of an available Walsh space, and wherein the second spreading code is a length-4 Walsh code that corresponds to one quarter of the available Walsh space.

13. The apparatus of claim 12, wherein the first traffic channel utilizes a first Walsh channel and a second Walsh channel, wherein the first Walsh channel uses the length-2 Walsh code, and wherein the second Walsh channel uses the length-4 Walsh code.

14. The apparatus of claim 11, wherein the first traffic channel is a reverse enhanced supplemental channel (R-ESCH).

15. The apparatus of claim 14, wherein the processor is further configured to:
receive second traffic channel data associated with a reverse rate indicator channel (R-RICH) that provides control information for the R-ESCH, wherein the second traffic channel data includes a third set of symbols; and
cover the third set of symbols with a length-64 Walsh code to generate a third covered symbol stream, and wherein the transmitter is further configured to transmit the third covered symbol stream via the wireless communication channel.

16. The apparatus of claim 11, further comprising a modulator and a demultiplexer, wherein the demultiplexer extracts the first set of symbols and the second set of symbols from a single stream of a plurality of symbols received from the modulator.

17. The apparatus of claim 16, wherein the first set of symbols includes a first one-third of the plurality of symbols received from the modulator, and wherein the second set of symbols includes a remaining two-thirds of the plurality of symbols received from the modulator.

18. The apparatus of claim 16, wherein the first set of symbols includes every third symbol of the plurality of symbols received from the modulator, and wherein the second set of symbols includes each remaining symbol of the plurality of symbols received from the modulator.

19. An apparatus, comprising:
means for receiving traffic channel data associated with a first traffic channel, wherein the traffic channel data includes a first set of symbols and a second set of symbols;
means for covering the first set of symbols with a first spreading code of a first length to generate a first covered symbol stream;
means for covering the second set of symbols with a second spreading code of a second length to generate a second covered symbol stream, wherein the second length is different from the first length;
means for combining the first covered symbol stream and the second covered symbol stream into a combined stream; and
means for transmitting the combined stream via a wireless communication channel.

20. The apparatus of claim 19, wherein the first spreading code is a length-2 Walsh code that corresponds to one half of an available Walsh space, and wherein the second spreading code is a first length-4 Walsh code that corresponds to one quarter of the available Walsh space.

21. The apparatus of claim 20, wherein the first traffic channel utilizes a first Walsh channel and a second Walsh channel, wherein the first Walsh channel uses the length-2 Walsh code, and wherein the second Walsh channel uses the first length-4 Walsh code.

22. The apparatus of claim 20, further comprising:
means for receiving second traffic channel data associated with a second traffic channel, wherein the second traffic channel data includes a third set of symbols; and
means for generating a third covered symbol stream for transmission via the wireless communication channel by covering the third set of symbols with a Walsh code that is a descendent of a second length-4 Walsh code that corresponds to a remaining quarter of the available Walsh space.

23. A computer readable tangible medium comprising instructions that, when executed by a processor, cause the processor to:
receive traffic channel data associated with a first traffic channel, wherein the traffic channel data includes a first set of symbols and a second set of symbols;
cover the first set of symbols with a first spreading code of a first length to generate a first covered symbol stream;
cover the second set of symbols with a second spreading code of a second length to generate a second covered symbol stream, wherein the second length is different from the first length;

combine the first covered symbol stream and the second covered symbol stream into a combined stream; and
transmit the combined stream via a wireless communication channel.

24. The computer readable tangible medium of claim 23, wherein the first spreading code is a length-2 Walsh code that corresponds to one half of an available Walsh space, and wherein the second spreading code is a length-4 Walsh code that corresponds to one quarter of the available Walsh space.

25. The computer readable tangible medium of claim 24, wherein the first traffic channel utilizes a first Walsh channel and a second Walsh channel, wherein the first Walsh channel uses the length-2 Walsh code, and wherein the second Walsh channel uses the length-4 Walsh code.

26. The computer readable tangible medium of claim 25, wherein the first traffic channel is a reverse enhanced supplemental channel (R-ESCH).

27. The computer readable tangible medium of claim 26, further comprising instructions that, when executed by the processor, cause the processor to:
receive second traffic channel data associated with a reverse rate indicator channel (R-RICH) that provides control information for the R-ESCH, wherein the second traffic channel data includes a third set of symbols;
cover the third set of symbols with a length-64 Walsh code to generate a third covered symbol stream; and
transmit the third covered symbol stream via the wireless communication channel.

28. A method, comprising:
receiving a combined stream of traffic channel data associated with a traffic channel;
demultiplexing the combined stream of traffic channel data into a first covered symbol stream and a second covered symbol stream, wherein the first covered symbol stream is covered with a first spreading code of a first length, and wherein the second covered symbol stream is covered with a second spreading code of a second length that is different from the first length;
decoding the first covered symbol stream into a first set of symbols using the first spreading code at a processor; and
decoding the second covered symbol stream into a second set of symbols using the second spreading code at the processor.

29. The method of claim 28, wherein the first spreading code is a length-2 Walsh code that corresponds to one half of an available Walsh space, and wherein the second spreading code is a first length-4 Walsh code that corresponds to one quarter of the available Walsh space.

30. The method of claim 29, wherein the traffic channel utilizes a first Walsh channel and a second Walsh channel, wherein the first Walsh channel uses the length-2 Walsh code, and wherein the second Walsh channel uses the first length-4 Walsh code.

31. The method of claim 30, wherein the traffic channel is a reverse enhanced supplemental channel (R-ESCH).

32. The method of claim 28, wherein the combined stream of traffic channel data is transmitted from a mobile station and received at a base station.

33. An apparatus, comprising:
a receiver to receive a combined stream of traffic channel data associated with a traffic channel;
a demultiplexer to demultiplex the combined stream of traffic channel data into a first covered symbol stream and a second covered symbol stream, wherein the first covered symbol stream is covered with a first spreading code of a first length, and wherein the second covered symbol stream is covered with a second spreading code of a second length that is different from the first length; and
decoding logic to decode the first covered symbol stream into a first set of symbols using the first spreading code and to decode the second covered symbol stream into a second set of symbols using the second spreading code.

34. The apparatus of claim 33, wherein the first spreading code is a length-2 Walsh code that corresponds to one half of an available Walsh space, and wherein the second spreading code is a length-4 Walsh code that corresponds to one quarter of the available Walsh space.

35. The apparatus of claim 34, wherein the first traffic channel utilizes a first Walsh channel and a second Walsh channel, wherein the first Walsh channel uses the length-2 Walsh code, and wherein the second Walsh channel uses the length-4 Walsh code.

36. The apparatus of claim 35, wherein the traffic channel is a reverse enhanced supplemental channel (R-ESCH).

37. An apparatus, comprising:
means for receiving a combined stream of traffic channel data associated with a traffic channel;
means for demultiplexing the combined stream of traffic channel data into a first covered symbol stream and a second covered symbol stream, wherein the first covered symbol stream is covered with a first spreading code of a first length, and wherein the second covered symbol stream is covered with a second spreading code of a second length that is different from the first length;
means for decoding the first covered symbol stream into a first set of symbols using the first spreading code; and
means for decoding the second covered symbol stream into a second set of symbols using the second spreading code.

38. The apparatus of claim 37, wherein the first spreading code is a length-2 Walsh code that corresponds to one half of an available Walsh space, and wherein the second spreading code is a length-4 Walsh code that corresponds to one quarter of the available Walsh space.

39. The apparatus of claim 38, wherein the first traffic channel utilizes a first Walsh channel and a second Walsh channel, wherein the first Walsh channel uses the length-2 Walsh code, and wherein the second Walsh channel uses the length-4 Walsh code.

40. The apparatus of claim 39, wherein the traffic channel is a reverse enhanced supplemental channel (R-ESCH).

41. A computer readable tangible medium comprising instructions that, when executed by a processor, cause the processor to:
receive a combined stream of traffic channel data associated with a traffic channel;
demultiplex the combined stream of traffic channel data into a first covered symbol stream and a second covered symbol stream, wherein the first covered symbol stream is covered with a first spreading code of a first length, and wherein the second covered symbol stream is covered with a second spreading code of a second length that is different from the first length;
decode the first covered symbol stream into a first set of symbols using the first spreading code; and
decode the second covered symbol stream into a second set of symbols using the second spreading code.

42. The computer readable tangible medium of claim 41, wherein the first spreading code is a length-2 Walsh code that corresponds to one half of an available Walsh space, and wherein the second spreading code is a length-4 Walsh code that corresponds to one quarter of the available Walsh space.

43. The computer readable tangible medium of claim 42, wherein the traffic channel utilizes a first Walsh channel and a second Walsh channel, wherein the first Walsh channel uses the length-2 Walsh code, and wherein the second Walsh channel uses the length-4 Walsh code.

44. The computer readable tangible medium of claim 43, wherein the traffic channel is a reverse enhanced supplemental channel (R-ESCH).

* * * * *